United States Patent
Lee et al.

(10) Patent No.: US 10,659,684 B2
(45) Date of Patent: May 19, 2020

(54) APPARATUS AND METHOD FOR PROVIDING DYNAMIC PANORAMA FUNCTION

(71) Applicant: Samsung Electronics Co., Ltd., Suwon-si, Gyeonggi-do (KR)

(72) Inventors: Si Hyoung Lee, Yongin-si (KR); Jae Hyun Kim, Suwon-si (KR); In Sun Song, Gwangmyeong-si (KR); Hoo Hyoung Lee, Suwon-si (KR); Ji Hwan Choe, Bucheon-si (KR); Ki Woong Kim, Damyang-gun (KR); Dong Jun Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 353 days.

(21) Appl. No.: 15/431,210

(22) Filed: Feb. 13, 2017

(65) Prior Publication Data
US 2017/0237901 A1 Aug. 17, 2017

(30) Foreign Application Priority Data
Feb. 16, 2016 (KR) ........................ 10-2016-0017863

(51) Int. Cl.
H04N 7/18 (2006.01)
H04N 5/232 (2006.01)
(Continued)

(52) U.S. Cl.
CPC ........... *H04N 5/23238* (2013.01); *G06T 7/33* (2017.01); *H04N 5/04* (2013.01); *H04N 5/23293* (2013.01);
(Continued)

(58) Field of Classification Search
CPC .................................................. H04N 5/23238
See application file for complete search history.

(56) References Cited

U.S. PATENT DOCUMENTS

| 6,356,297 B1 * | 3/2002 | Cheng | H04N 19/00 348/36 |
| 6,885,392 B1 * | 4/2005 | Mancuso | G06T 3/4038 348/218.1 |

(Continued)

FOREIGN PATENT DOCUMENTS

| CN | 105120155 A | 12/2015 |
| JP | 2014-504410 A | 2/2014 |

(Continued)

OTHER PUBLICATIONS

Partial EP Search Report dated Nov. 6, 2018 issued in EP Application No. 17753439.3.

*Primary Examiner* — Leron Beck
(74) *Attorney, Agent, or Firm* — Jefferson IP Law, LLP

(57) ABSTRACT

An electronic device and a method of operating a panorama function in the electronic device are provided. The electronic device includes at least one processor, a memory, a camera configured to sequentially obtain a plurality of images if an image capture is started, and a sensor configured to sense motion of the electronic device. The at least one processor is configured to store in the memory a panorama content file comprising panorama image data and dynamic panorama data generated based on the plurality of images and the motion of the electronic device sensed during the image capture.

19 Claims, 10 Drawing Sheets

(51) Int. Cl.
  H04N 5/04 (2006.01)
  G06T 7/33 (2017.01)
  H04N 7/01 (2006.01)

(52) U.S. Cl.
  CPC .............. *G06T 2207/10016* (2013.01); *H04N 5/23258* (2013.01); *H04N 7/0127* (2013.01)

(56) References Cited

U.S. PATENT DOCUMENTS

| | | | |
|---|---|---|---|
| 8,411,133 B2 | 4/2013 | Kim et al. | |
| 9,147,260 B2 | 9/2015 | Hampapur et al. | |
| 10,021,295 B1* | 7/2018 | Baldwin | H04N 5/232935 |
| 2005/0195283 A1* | 9/2005 | Sakuda | H04N 5/765 |
| | | | 348/207.99 |
| 2006/0262184 A1* | 11/2006 | Peleg | G06T 3/0087 |
| | | | 348/36 |
| 2009/0115840 A1 | 5/2009 | Kim et al. | |
| 2010/0118160 A1* | 5/2010 | Tsurumi | G06T 3/0087 |
| | | | 348/231.2 |
| 2012/0019613 A1 | 1/2012 | Murray et al. | |
| 2012/0154579 A1 | 6/2012 | Hampapur et al. | |
| 2013/0002866 A1 | 1/2013 | Hampapur et al. | |
| 2013/0208082 A1* | 8/2013 | Williams | H04N 5/2254 |
| | | | 348/36 |
| 2015/0149960 A1 | 5/2015 | Song et al. | |
| 2015/0222815 A1* | 8/2015 | Wang | G11B 27/031 |
| | | | 348/36 |
| 2015/0296139 A1 | 10/2015 | Onyenobi | |
| 2017/0054906 A1 | 2/2017 | Chen et al. | |
| 2017/0272649 A1 | 9/2017 | Liu et al. | |
| 2017/0272698 A1 | 9/2017 | Liu et al. | |

FOREIGN PATENT DOCUMENTS

| | | |
|---|---|---|
| JP | 2014168147 A | 9/2014 |
| KR | 20090045643 A | 5/2009 |
| KR | 10-2015-0073692 A | 7/2015 |
| KR | 10-2015-0118043 A | 10/2015 |
| WO | 2016-015624 A1 | 2/2016 |

* cited by examiner

APPARATUS AND METHOD FOR PROVIDING DYNAMIC PANORAMA FUNCTION

CROSS-REFERENCE TO RELATED APPLICATION(S)

This application claims the benefit under 35 U.S.C. § 119(a) of a Korean patent application filed on Feb. 16, 2016 in the Korean Intellectual Property Office and assigned Serial number 10-2016-0017863, the entire disclosure of which is hereby incorporated by reference.

TECHNICAL FIELD

The present disclosure relates to technologies for generating and consuming content using images obtained through panorama image capture.

BACKGROUND

A panorama image capture function provided from a smartphone or digital camera of the related art may generate one panorama image (still image) using images obtained through panorama image capture.

However, if an object moves during panorama image capture, a conventional panorama image may be incorrectly matched or one object may be represented as a plurality of objects, thus hindering the quality of images or user experience.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method and an electronic device for providing a dynamic panorama function.

In accordance with an aspect of the present disclosure, an electronic device is provided. The electronic device includes at least one processor, a memory, a camera module configured to sequentially obtain a plurality of images if image capture is started, and a sensor configured to sense motion of the electronic device. The at least one processor may be configured to store in the memory a panorama content file comprising panorama image data and dynamic panorama data generated based on the plurality of images and the motion of the electronic device sensed during the image capture.

In accordance with another aspect of the present disclosure, an electronic device is provided. The electronic device includes a memory, a camera, a sensor, and at least one processor. The camera is configured to sequentially obtain a plurality of images if an image capture is started. The sensor is configured to sense motion of the electronic device. The at least one processor is configured to generate panorama image data based on the plurality of images and the motion of the electronic device sensed during the image capture, and store a panorama content file, comprising the panorama image data and dynamic panorama data corresponding to the panorama image data, and metadata, comprising information about the plurality of images and analysis information used to generate the panorama image data, in the memory.

In accordance with yet another aspect of the present disclosure, method of operating a panorama function of an electronic device is provided. The method includes obtaining a plurality of images via a camera of the electronic device, sensing motion of the electronic device, while obtaining the plurality of images, generating panorama image data based on the plurality of images and the motion, generating dynamic panorama data based on the plurality of images and analysis information used to generate the panorama image data, and generating a panorama content file comprising the panorama image data and the dynamic panorama data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
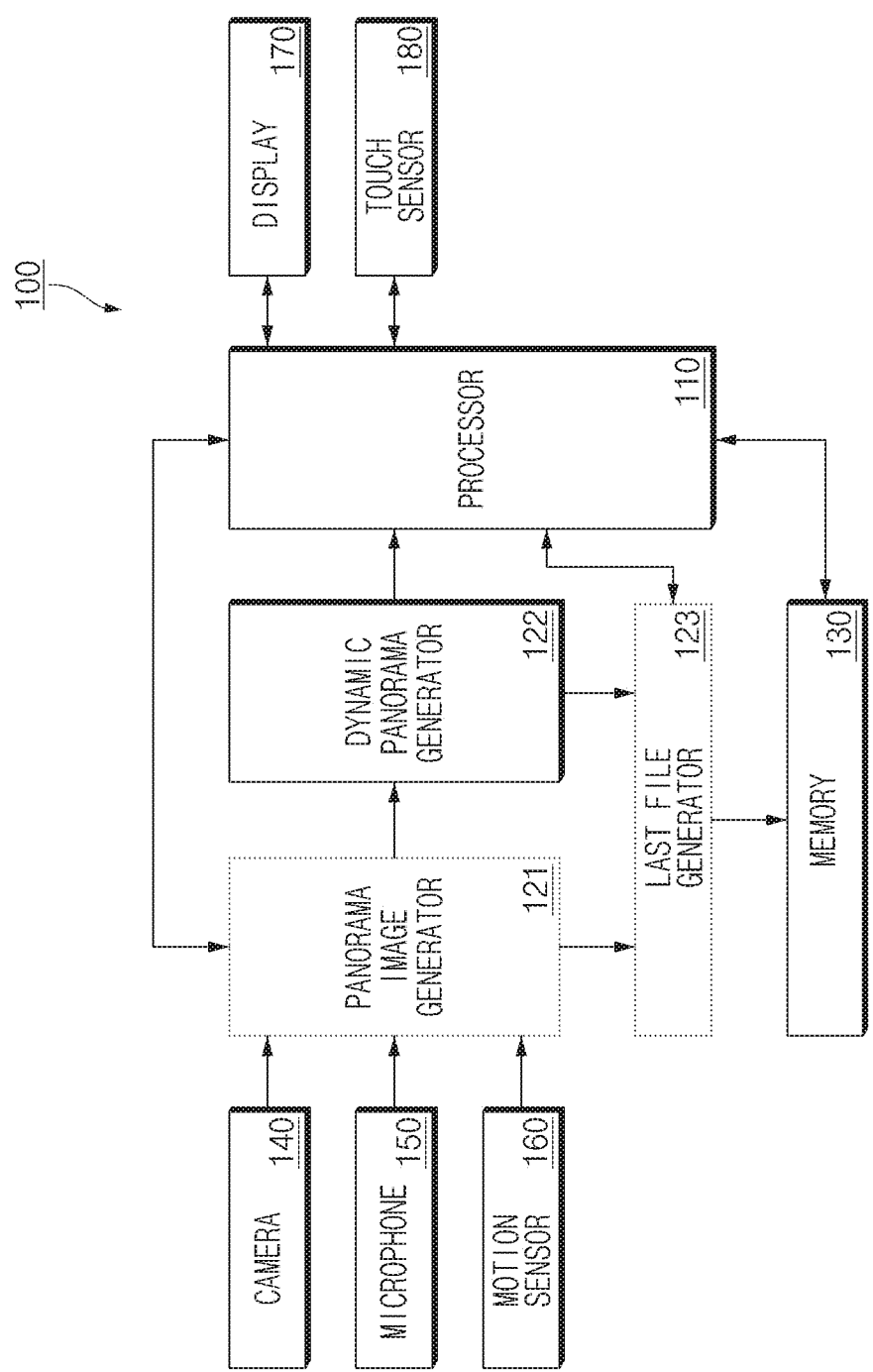
FIG. 1 is a block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "include," "comprise," and "have", or "may include," or "may comprise" and "may have" used herein indicates disclosed functions, operations, or existence of elements but does not exclude other functions, operations or elements.

For example, the expressions "A or B," or "at least one of A and/or B" may indicate A and B, A, or B. For instance, the expression "A or B" or "at least one of A and/or B" may indicate (1) at least one A, (2) at least one B, or (3) both at least one A and at least one B.

The terms such as "1st," "2nd," "first," "second," and the like used herein may refer to modifying various different elements of various embodiments of the present disclosure, but are not intended to limit the elements. For instance, "a first user device" and "a second user device" may indicate different users regardless of order or importance. For example, a first component may be referred to as a second component and vice versa without departing from the scope and spirit of the present disclosure.

In various embodiments of the present disclosure, it is intended that when a component (for example, a first component) is referred to as being "operatively or communicatively coupled with/to" or "connected to" another component (for example, a second component), the component may be directly connected to the other component or connected through another component (for example, a third component). In various embodiments of the present disclosure, it is intended that when a component (for example, a first component) is referred to as being "directly connected to" or "directly accessed" another component (for example, a second component), another component (for example, a third component) does not exist between the component (for example, the first component) and the other component (for example, the second component).

The expression "configured to" used in various embodiments of the present disclosure may be interchangeably used with "suitable for," "having the capacity to," "designed to," "adapted to," "made to," or "capable of" according to the situation, for example. The term "configured to" may not necessarily indicate "specifically designed to" in terms of hardware. Instead, the expression "a device configured to" in some situations may indicate that the device and another device or part are "capable of" For example, the expression "a processor configured to perform A, B, and C" may indicate a dedicated processor (for example, an embedded processor) for performing a corresponding operation or a general purpose processor (for example, a central processing unit (CPU) or application processor (AP)) for performing corresponding operations by executing at least one software program stored in a memory device.

Terms used in various embodiments of the present disclosure are used to describe certain embodiments of the present disclosure, but are not intended to limit the scope of other embodiments. Otherwise, all terms used herein may have the same meanings that are generally understood by a person skilled in the art. In general, terms defined in a dictionary should be considered to have the same meanings as the contextual meaning of the related art, and, unless clearly defined herein, should not be understood differently or as having an excessively formal meaning. In any case, even the terms defined in the present specification are not intended to be interpreted as excluding various embodiments of the present disclosure.

An electronic device according to various embodiments of the present disclosure may include at least one of a smartphone, a tablet personal computer (PC), and a digital camera supporting a panorama function. An electronic device may be one or more combinations of the above-mentioned devices. An electronic device according to some various embodiments of the present disclosure may be a flexible device. An electronic device according to an embodiment of the present disclosure is not limited to the above-mentioned devices, and may include new electronic devices with the development of new technology.

Hereinafter, an electronic device according to various embodiments of the present disclosure will be described in more detail with reference to the accompanying drawings. The term "user" used herein may refer to a person who uses an electronic device or may refer to a device (e.g., an artificial intelligence electronic device) that uses an electronic device.

FIG. 1 is a block diagram illustrating a configuration of an electronic device according to an embodiment of the present disclosure.

Referring to FIG. 1, an electronic device 100 may include a processor 110. The processor 110 may perform a function of processing a variety of calculations and controlling hardware/software components of the electronic device 100. For example, the processor 110 may include a panorama image generator 121, a dynamic panorama generator 122, and a last file generator 123.

In an embodiment, some or all of the panorama image generator 121, the dynamic panorama generator 122, and the last file generator 123 may be implemented with a software module. For example, a memory 130 may store instructions for implementing the panorama image generator 121 and the last file generator 123 with software. The processor 110 may load a first instruction set stored in the memory 130 into a framework to implement the panorama image generator 121. The processor 110 may load a second instruction set into the framework to implement the dynamic panorama generator 122. In an embodiment, the dynamic panorama generator 122 may be implemented with hardware. The dynamic panorama generator 122 implemented with hardware may be referred to as a dynamic panorama generation circuit.

The memory 130 may store instructions for implementing various embodiments, an application, and files. For example, the memory 130 may store the above-mentioned first instruction set, the above-mentioned second instruction set, a panorama content file according to an embodiment, and an application associated with the panorama content file.

In an embodiment, the camera 140 may obtain a plurality of images. For example, if an image capture button for obtaining a panorama image is selected on a user interface displayed on a display 170 of the electronic device 100 or if a physical key or a physical button for starting to capture an image is pushed by a user, the electronic device 100 may continuously obtain images via the camera 140. The electronic device 100 may obtain a proper number of images for generating a panorama image and a dynamic panorama for each second via the camera 140. For example, the electronic device 100 may obtain 24 images per second or 60 images per second. The electronic device 100 may stop obtaining an image in response to an input for stopping the image capture (e.g., reselection of the image capture button).

In an embodiment, a microphone 150 may obtain audio data generated around the electronic device 100 during image capture in progress. For example, voices of a person or noises around the electronic device 100 may be obtained as audio data. Also, in an embodiment, the microphone 150 may recognize a voice instruction of the user for starting or stopping image capture. For example, the processor 110 may allow the camera 140 to obtain a plurality of images until the voice instruction "stop" is recognized in response to the voice instruction "start" in a state where a user interface for panorama image capture is displayed. For another example, the processor 110 may allow the camera 140 to obtain a plurality of images in response to the voice instruction "start panorama" in a state where the display 170 of the electronic device 100 is turned off or where an application is being executed.

In an embodiment, a motion sensor 160 may sense motion of the electronic device 100 during image capture in progress to obtain information about the motion. The motion sensor 160 may correspond to, for example, an acceleration sensor or a gyro sensor, or a combination of the acceleration sensor and the gyro sensor. In general, panorama image capture may be performed while the user moves the electronic device 100 such as a smartphone in a direction (e.g., to the right) in a state where image capture is started. Thus, the motion sensor 160 may obtain motion information of the electronic device 100, such as a direction and distance where the electronic device 100 is moved and an up-and-down shake which occurs while the electronic device 100 is moved. Also, if the motion sensor 160 senses that the electronic device 100 is moved in a direction by a specified distance from a time when panorama image capture is started, the processor 110 may stop the panorama image capture. The specified distance may be defined in a different way based on a maximum size of an image file which may be processed by the processor 110 or the panorama image generator 121. In addition, if a movement direction of the electronic device 100 is changed to an opposite direction during panorama image capture or if it is determined that it is difficult to perform additional image matching since motion of an up-and-down direction of the electronic device 100 is increased in width, the processor 110 may stop the panorama image capture. The up-and-down direction is assumed if the electronic device 100 performs panorama image capture while being moved in a left and right direction. In general, if motion in a second direction perpendicular to a first direction departs from a specified range while the electronic device 100 performs panorama image capture while being moved in the first direction, the processor 100 may stop the panorama image capture.

The display 170 may display a panorama image according to an embodiment and may reproduce a panorama video according to an embodiment. For example, the processor 110 may generate a panorama content file including panorama image data corresponding to the panorama image and dynamic panorama data corresponding to the panorama video and may store the generated panorama content file in the memory 130. In an embodiment, if an application associated with the panorama content file, for example, a gallery application, a photo application, or the like is executed, the display 170 may output normal images or a panorama image in a proper form (e.g., a thumbnail and the like). If the user selects the panorama image, the display 170 may output the panorama image. In this case, the display 170 may output the panorama image together with an item (e.g., an icon, a menu, and the like) indicating that there is dynamic panorama data corresponding to the panorama image. If the item is selected, the processor 110 may reproduce a panorama video based on the dynamic panorama data on the display 170.

A touch sensor 180 may receive a touch input from the user. In an embodiment, the touch sensor 180 may be integrated with the display 170 to be implemented with, for example, a touch screen panel and the like. In the present disclosure, it is assumed that most user operations are performed by touch inputs. However, a touch input may be replaced with a user input by another input means such as a physical key or a physical button.

Figure 2:
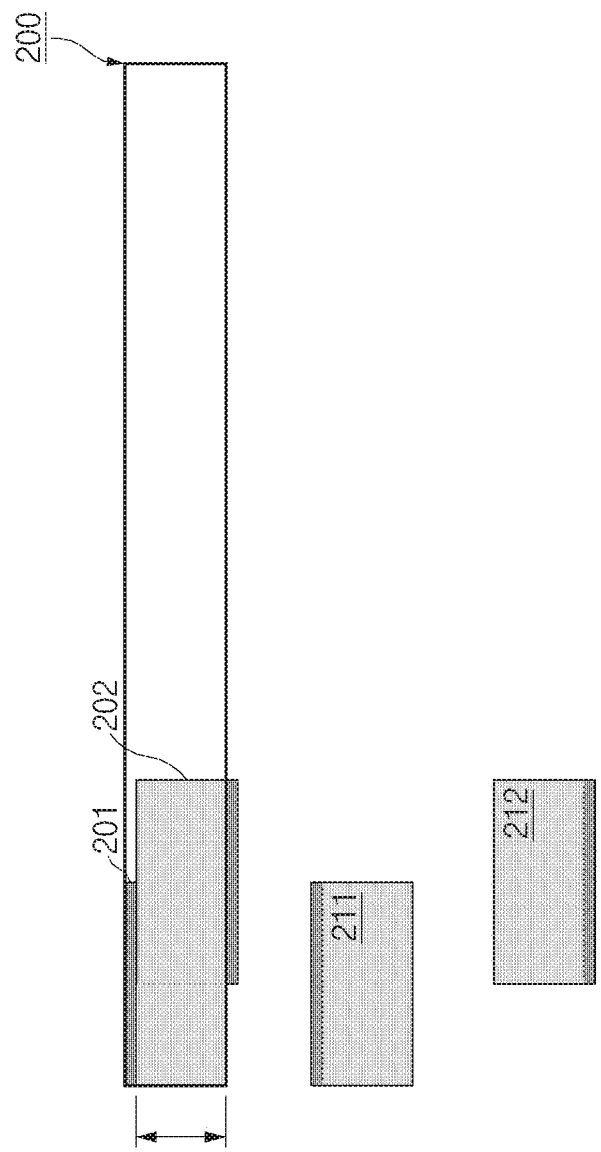
FIG. 2 is a drawing illustrating a process of generating panorama image data according to an embodiment of the present disclosure.

FIG. 2 is a drawing illustrating a process of generating panorama image data according to an embodiment of the present disclosure.

Referring to FIG. 2, after panorama image capture is started, a first image 201 and a second image 202 may be sequentially obtained. The first image 201 and the second image 202 may have the same resolution (e.g., width W×height H). A width value and a height value of resolution may be changed to each other based on an image capture mode (e.g., a landscape mode/portrait mode) of an electronic device 100 of FIG. 1 sensed by a sensor (e.g., a gyro sensor). For example, if the first image 201 has 1600×900 resolution when a camera 140 of FIG. 1 is in the landscape mode, the first image 201 may have 900×1600 resolution if the camera 140 is in the portrait mode. In various embodiments of FIGS. 2 and 3, an image is obtained in a state where image capture is performed in the landscape mode. However, if an image is captured in the portrait mode, it may be applied to the same embodiment as the various embodiments of FIGS. 2 and 3.

The electronic device 100 may shake up and down during panorama image capture. For example, the second image 202 may be located at a little lower side than the first image 201. Since a virtual panorama region 200 is set by the first image 201 initially obtained, a region which departs from the panorama region 200 may be excluded from a panorama image. For example, an image 212, a region of which is excluded from a lower end of the second image 202, may be used to generate the panorama image. Also, an image 211, a region of which is excluded from an upper end of the first image 201, may be used to generate the panorama image in response to the region excluded from the second image 202 to prevent a blank portion from being generated in the panorama image.

The operation described with reference to FIG. 2 may be performed by a panorama image generator 121 of FIG. 1. The panorama image generator 121 may perform a task of generating panorama image data by using image sequentially obtained by the camera 140 as input images. The task of the generating the panorama image data may correspond to a task (e.g., image matching) of adding a previously obtained image to a current image. The panorama image generator 121 may perform image matching based on the images obtained by the camera 140 and motion information sensed by a motion sensor 160 of FIG. 1. In detail, the panorama image generator 121 may extract a feature point of each of the first image 201 and the second image 202 by analyzing pixel values of the first image 201 and the second image 202. Also, the panorama image generator 121 may estimate a location of the electronic device 100 based on motion information of the electronic device 100, obtained by the motion sensor 160. If it is determined that the feature point is changed or that the location of the electronic device 100 is changed, the panorama image generator 121 may match the second image 202 to the first image 201 based on the determination. The panorama image generator 121 may repeatedly perform the above-mentioned matching process during panorama image capture in progress. In other words, the panorama image generator 121 may continuously match a currently obtained image to a previously matched image based on image processing and motion information until the panorama image capture is stopped.

If the image matching progresses, the panorama image generator 121 may provide information for generating dynamic panorama data to a dynamic panorama generator 122. For example, the images 211 and 212 and a variety of analysis information used for the image matching may be provided to the dynamic panorama generator 122. A process of generating the dynamic panorama data will be given with reference to FIG. 3.

Figure 3:
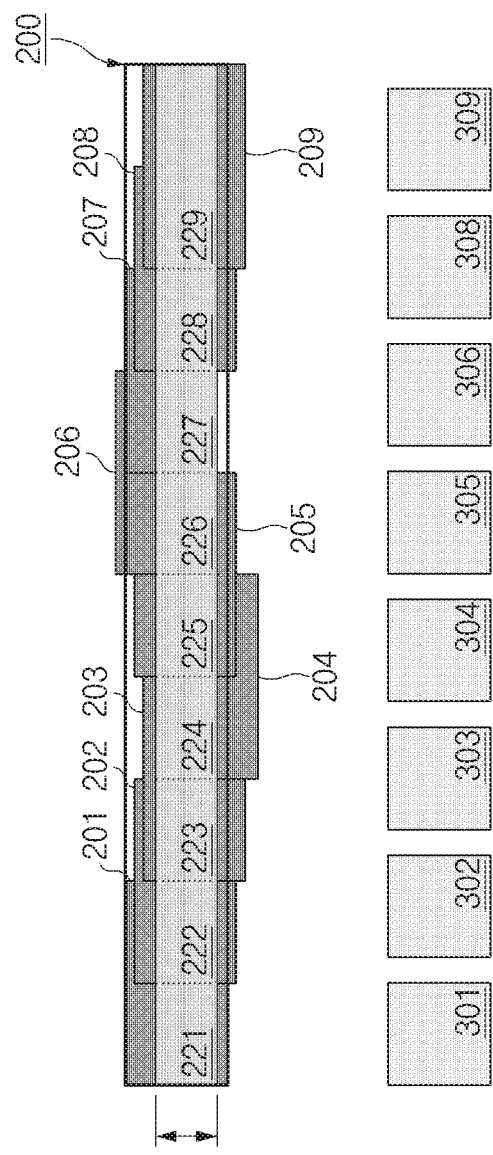
FIG. 3 is a drawing illustrating a process of generating dynamic panorama image data according to an embodiment of the present disclosure.

FIG. 3 is a drawing illustrating a process of generating dynamic panorama image data according to an embodiment of the present disclosure.

Referring to FIG. 3, $1^{st}$ to $9^{th}$ images 201 to 209 may be used to generate panorama image data and dynamic panorama image. It is necessary for a larger number of images to generate real panorama image data and/or real dynamic panorama data. However, a description will be given of 9 images for convenience of description with reference to FIG. 3. For example, a first plurality of images may be obtained during panorama image capture, and a second plurality of images to be used to generate panorama image data may be selected among the first plurality of images. In the present disclosure, except if specifically noted, a plurality of images may refer to the second plurality of images used to generate panorama image data and dynamic panorama data among the first plurality of images.

A dynamic panorama generator 122 of FIG. 1 may receive images 221 to 229 used to generate a panorama image or information about the images 221 to 229 from a panorama image generator 121 of FIG. 1. Herein, the information about the images 221 to 229 may include the images 221 to 229 used to generate the panorama image data among a plurality of images obtained by a camera 140 of FIG. 1 and information in which each of the used images 221 to 229 is edited (e.g., a region used for image matching, and the like).

The images 221 to 229 received in the dynamic panorama generator 122 may be continuously updated during panorama image capture in progress (or during image matching in progress in the panorama image generator 121). For example, in a state shown in FIG. 2, the dynamic panorama generator 122 may receive images 211 and 212. If proceeding with panorama image capture in this state, for example, if proceeding with image matching to the $6^{th}$ image 206, the dynamic panorama generator 122 may finally update the images 211 and 212 to the images 221 and 22 and may further obtain the images 223 to 226. Although the $7^{th}$ to $9^{th}$ images 207, 208, and 209 are obtained in this state, since a height of a panorama image is not changed when the panorama image generator 121 performs image matching, the images 221 to 226 may fail to be updated. Thus, the dynamic panorama generator 122 may additionally obtain only the images 227 to 229 used for image matching in the panorama image generator 121.

In an embodiment, the dynamic panorama generator 122 may generate dynamic panorama data using an image (e.g., the image 221 and the like) used for image matching in the panorama image generator 121. Images may be resized and/or encoded to reduce capacity of a last result (e.g., a panorama content file). For example, the dynamic panorama data may correspond to a kind of encoded moving image data. The dynamic panorama generator 122 may encode each of images used for image matching into a Motion Picture Experts Group audio layer 4 (MP4) file format and may provide the encoded result data as dynamic panorama data to a last file generator 123 of FIG. 1.

In another embodiment, the dynamic panorama generator 122 may generate dynamic panorama data using an input image (e.g., the first image 201 and the like) used for image matching in the panorama image generator 121 and analysis information used for the image matching. The analysis information may be a kind of metadata, and may be stored in a memory 130 of FIG. 1 or may be stored in a partial region of a panorama content file, and may be used when a panorama video is reproduced. The panorama video may refer to a moving image reproduced based on dynamic panorama data.

As such, according to an embodiment, since the dynamic panorama generator 122 uses information (e.g., an input image, image analysis information, and motion information of an electronic device 100 of FIG. 1) used by the panorama image generator 121, an amount of calculation or a calculation processing time may be reduced, compared to the case where each of the panorama image generator 121 and the dynamic panorama generator 122 independently generate image/video data. Since the dynamic panorama generator 122 uses result data calculated by the panorama image generator 121, the panorama image generator 121 may referred to as a first result image generator, and the dynamic panorama generator 122 may be referred to as a second result image generator. Similarly, the last file generator 123 may be referred to as a third result image generator.

The dynamic panorama generator 122 may generate the dynamic panorama data using the image using the images 222 to 229 used for image matching. For example, the dynamic panorama generator 122 may generate dynamic panorama data temporally and spatially synchronized with panorama image data based on the images 221 to 229 and analysis information used to generate the panorama image data. The dynamic panorama data may include frames for reproducing a moving image. For example, the dynamic panorama data may include frames 301 to 309. Each frame (e.g., the frame 301 or the like) may the same as each image (e.g., the image 221 or the like) or may be image data properly encoded to be suitable for reproducing a video.

In an embodiment, the dynamic panorama generator 122 may generate dynamic panorama data using the original images 201 to 209 (or resized original images) used for image matching. For example, the dynamic panorama generator 122 may encode original images obtained upon panorama image capture into a moving image and may generate analysis information used for image matching, motion information of the electronic device 100, time information, and the like as metadata. In this case, panorama image data (e.g., a single panorama image in which matching is completed), dynamic panorama data (e.g., encoded moving image data), and metadata may be included in a panorama content file. In another embodiment, the metadata may be stored in a separate file linked to the panorama content file.

Figure 4:
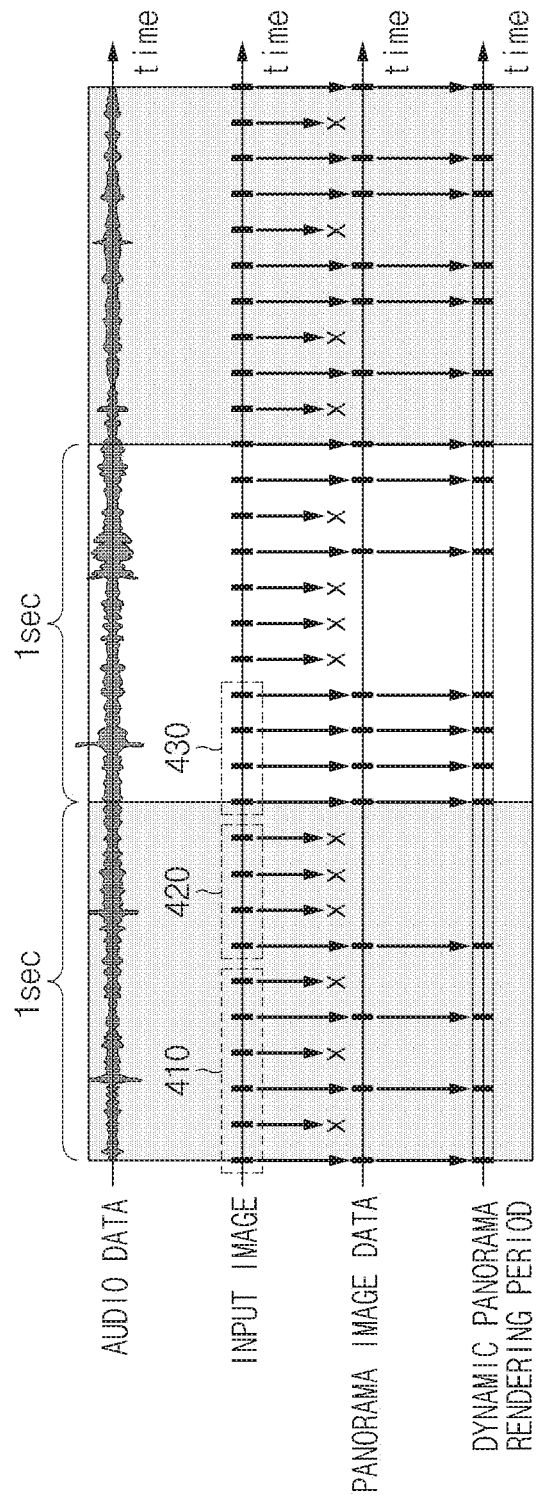
FIG. 4 is a drawing illustrating a process of synchronizing panorama image data with dynamic panorama data according to an embodiment of the present disclosure.

FIG. 4 is a drawing illustrating a process of synchronizing panorama image data with dynamic panorama data according to an embodiment of the present disclosure.

Referring to FIG. 4, audio data may correspond to audio data obtained by a microphone 150 of FIG. 1 during panorama image capture. An input image may correspond to images sequentially obtained by a camera 140 of FIG. 1 during panorama image capture. The images obtained by the camera 140 may be provided as input images to a panorama image generator 121 of FIG. 1. The panorama image generator 121 may use some of the provided images to generate panorama image data. For example, if it is determined that the electronic device 100 is moved at a level or more or that an object captured by the camera 160 is changed at a level or more, based on motion of an electronic device 100 of FIG. 1 sensed by a motion sensor 160 of FIG. 1 and a change of a feature point between a previous input image and a current input image, the panorama image generator 121 may select a corresponding input image as an image for generating the panorama image data. Referring to FIG. 4, an embodiment is exemplified as 10 images per second are obtained. However, various embodiments are not limited thereto. For example, the number of images obtained per second may be changed by performance of a camera 140 of FIG. 1, a setting of the electronic device 100, user settings, or the like.

In an embodiment, the electronic device 100 may be moved to be relatively slower than a movement speed optimized for generating a panorama image in a first time interval 410 in the entire panorama image capture time. Therefore, the panorama image generator 121 may use three of six images obtained in the first time interval 410 to generate panorama image data. In other words, the panorama image generator 121 may fail to use a second image obtained at a time when it is determined that a motion (e.g., a movement distance) of the electronic device 100 is insufficient to perform image matching and may use a third image obtained when sufficient motion occurs to perform image matching, with respect to a first image obtained in the first time interval 410.

Further, in a second time interval 420 in the entire panorama image capture time, the electronic device 100 may not be actually moved or may be very slowly moved. Thus, the panorama image generator 121 may use a first image among 4 images obtained in the second time interval 420 to generate panorama image data and may fail to use the other 3 images to generate the image panorama image data.

In a third time interval 430 in the entire panorama image capture time, the electronic device 100 may be moved at a proper speed. Thus, the panorama image generator 121 may use all of 4 images obtained as input images to generate panorama image data.

If using some selected among input images to generate panorama image data, that is, if proceeding with image matching using the selected images, the panorama image generator 121 may provide information about the input images used for the image matching and analysis information used for the image matching to a dynamic panorama generator 122 of FIG. 1. For example, if 100 images obtained by a camera 140 of FIG. 1 are provided to as input images to the panorama image generator 121 and if twenty-seven of the 100 images are used to generate panorama image data, the panorama image generator 121 may provide information about the 27 images and used analyzed information (e.g., feature point information of each of the 27 images, information about a time when each of the 27 images is obtained, information in which each of the 27 images is cropped, motion information of the electronic device 100, and the like) to the dynamic panorama generator 122. In the above-mentioned example, the panorama image generator 121 may perform 26 image matching processes (a series of tasks of additionally stitching 26 images onto a first image) and may provide image information and analysis information updated for each image matching process to the dynamic panorama image generator 122. Also, as described above, if the panorama image generator 121 provides an image edited to generate panorama image data (e.g., an image, part of an upper or lower end of which is cropped) to the dynamic panorama generator 122, editing information may fail to be provided to the dynamic panorama generator 122.

A dynamic panorama rendering period may correspond to a period of rendering images (frames) included in dynamic panorama data when the dynamic panorama data generated by the dynamic panorama generator 122 is reproduced. For example, the dynamic panorama data may be rendered to be reproduced based on an image capture time upon panorama image capture and motion of the electronic device 100 when reproduced by a processor 110 of FIG. 1. For example, the dynamic panorama data may be rendered at a different frame rate for each time interval, that is, at a variable frame rate. For example, the dynamic panorama data may be rendered at 4 frames per second (4 FPS) in the first time interval 410. The dynamic panorama data may be rendered at 2 frames per second (2 FPS) in the second time interval 420. The dynamic panorama data may be rendered at 8 frames per second (8 FPS) in the third time interval 430. In this case, a panorama video is reproduced by the processor 110, a playback speed may be the same at one time speed in the entire time interval. However, a user may feel as if the panorama video is reproduced at 0.5 times speed in the first time interval. The user may feel as if the panorama video is reproduced at 0.25 times speed in the second time interval. The numeral values of the frame rate described with reference to FIG. 4 are exemplified for convenience of description, and may be modified in various manners by those skilled in the art.

For another example, dynamic panorama data may be rendered at a constant frame rate for each time interval, but may be reproduced in a different way for each time interval by the processor 110. In this case, the processor 110 may refer to analysis information (e.g., information about a time when an image is obtained) when a panorama video is reproduced. For example, a panorama video generated by rendering a dynamic panorama may be reproduced to be slower two times than a reference speed during the first time interval 410 (10 frames per second may be reproduced in an example of FIG. 4). The panorama video may be actually stopped or may be very slowly reproduced like a slow motion in the second time interval 420. The panorama video may be reproduced at the reference speed in the third time interval 430.

In the above-mentioned examples, a panorama video may be reproduced with the same or similar feeling to an image displayed on a display 170 of the electronic device 100 upon real panorama image capture. Also, as a time when a panorama video is reproduced and a time when audio data obtained via a microphone 150 of FIG. 1 is reproduced are synchronized with each other one to one, since an audio is undistorted when the panorama video is reproduced, video and audio upon image capture may be reproduced. The rendering/playback of the panorama video in the above-mentioned manner may be referred to as rendering/playback about audio in the present disclosure.

However, in another embodiment, dynamic panorama data may be rendered at a constant frame rate, and a panorama video may be reproduced at a constant speed. Since images used to generate the dynamic panorama data are images, in which motion of a constant level occurs to a previous image, used for image matching of the panorama image data, a change amount of an image displayed on the display 170 of the electronic device 100 may be a constant amount. In other words, the electronic device 100 may show the entire panorama image at a constant speed from left to right or from right to left. The rendering/playback of the panorama video in the above-mentioned manner may be referred to as rendering/playback about video in the present disclosure.

When dynamic panorama data is rendered about video, as audio data is synchronized with a time when a plurality of images are obtained, a playback speed of audio data may be changed for each time interval. For example, audio data generated in the second time interval 420 may have temporally the same length as audio data obtained in the third time interval 430. However, a playback time of a panorama video corresponding to the second time interval 420 may be only ⅓ of a playback time of a panorama video corresponding to the third time interval 430. Thus, when a dynamic panorama is reproduced about video, audio data of the second time interval 420 may be reproduced at three times speed.

In an embodiment, when dynamic panorama data is rendered or reproduced about video, the processor 110 may fail to reproduce audio data not to hinder user experience. In another embodiment, the processor 110 may classify audio data into a voice interval and a silence interval, may reproduce a panorama video about audio at the voice interval (i.e., change a playback speed), may reproduce the panorama video about video at the silence interval.

In an embodiment, when dynamic panorama data is rendered about video, the processor 110 may reproduce audio data corresponding to a moved object. For example, if capturing a play or musical performance in which a user A, a user B, and a user B appear, using a panorama function, the processor 110 may recognize a direction of a speech which occurs from each of the users A to C. For example, when the user A is displayed on the display 170 of the electronic device 100 during panorama image capture, if the user A and the user B alternately speak their lines, the electronic device 100 may distinguish audio data collected from a direction where the user A is located from audio data collected from a direction where the user B is located. For example, if there are a plurality of microphones, the processor 110 may map an audio data interval to an image capture direction based on the image capture direction of the electronic device 100, determined using a phase difference between audio waveforms collected from the plurality of microphones and various sensors (e.g., an acceleration sensor, a geomagnetic sensor, a gyro sensor, and the like) of the electronic device 100. When reproducing dynamic panorama data, if a specific direction is shown or if an object (e.g., the user A) corresponding to the specific direction is shown, the processor 110 may reproduce audio data corresponding to the corresponding object (i.e., the corresponding direction). If it is started to show an object (i.e., the user B) corresponding to another direction, the processor 110 may reproduce audio data corresponding to a direction of the user B.

Hereinafter, a description will be given of a process of generating and storing a panorama content file with reference to FIGS. 5 and 6. The same, similar, or corresponding contents to the above-mentioned contents will be omitted from a description below.

Figure 5:
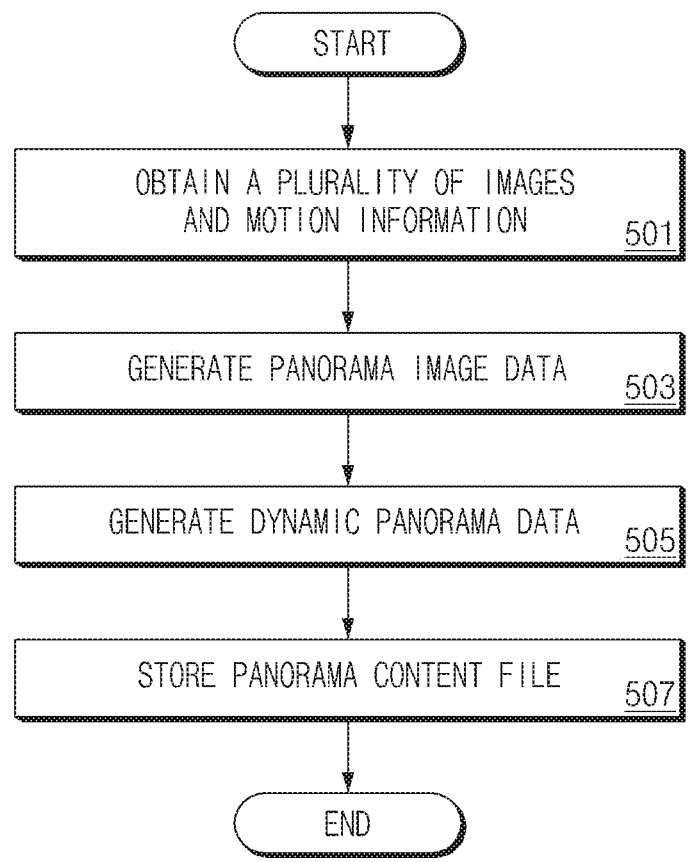
FIG. 5 is a flowchart illustrating the entire process of generating a panorama content file according to an embodiment of the present disclosure.

FIG. 5 is a flowchart illustrating the entire process of generating a panorama content file according to an embodiment of the present disclosure.

Referring to FIG. 5, in operation 501, an electronic device 100 of FIG. 1 may obtain a plurality of images via a camera 140 of FIG. 1 during panorama image capture in progress. Herein, the plurality of images may correspond to a first plurality of images. Also, the electronic device 100 may obtain motion information of the electronic device 100 via a motion sensor 100 of FIG. 1 while a plurality of images are obtained. In addition, the electronic device 100 may further obtain audio data. The plurality of obtained images, the obtained motion information, and the obtained audio data may be matched to each other relative to a time when each of the plurality of images, the motion information, and the audio data is obtained.

In operation 503, the electronic device 100 may generate panorama image data based on the plurality of obtained images and the obtained motion information. For example, the electronic device 100 (e.g., a panorama image generator 121 of FIG. 1) may generate panorama image data by selecting a second plurality of images to be used for image matching based on motion information and analysis information of each of the first plurality of images among the first plurality of images and performing image matching using the second plurality of images.

In operation 505, the electronic device 100 may generate dynamic panorama data based on the data (e.g., the second plurality of images) and the analysis information used in operation 503.

In operation 507, the electronic device 100 may generate a panorama content file including the panorama image data and the dynamic panorama data and may store the generated panorama content file in a storage space (e.g., a memory 130) of the electronic device 100. As described above, the analysis information may be metadata and may be stored to be independent of the panorama content file. If the metadata is stored to be independent of the panorama content file, the electronic device 100 may refer to metadata for synchronization when rendering a panorama video using the dynamic panorama data. In the present disclosure, an embodiment of storing the metadata to be independent of the panorama content file may be replaced with an embodiment of not storing the metadata to be independent of the panorama content file. Hereinafter, a description will be given of the embodiment of not storing the metadata to be independent of the panorama content file to exclude unnecessary duplication of the description.

Figure 6:
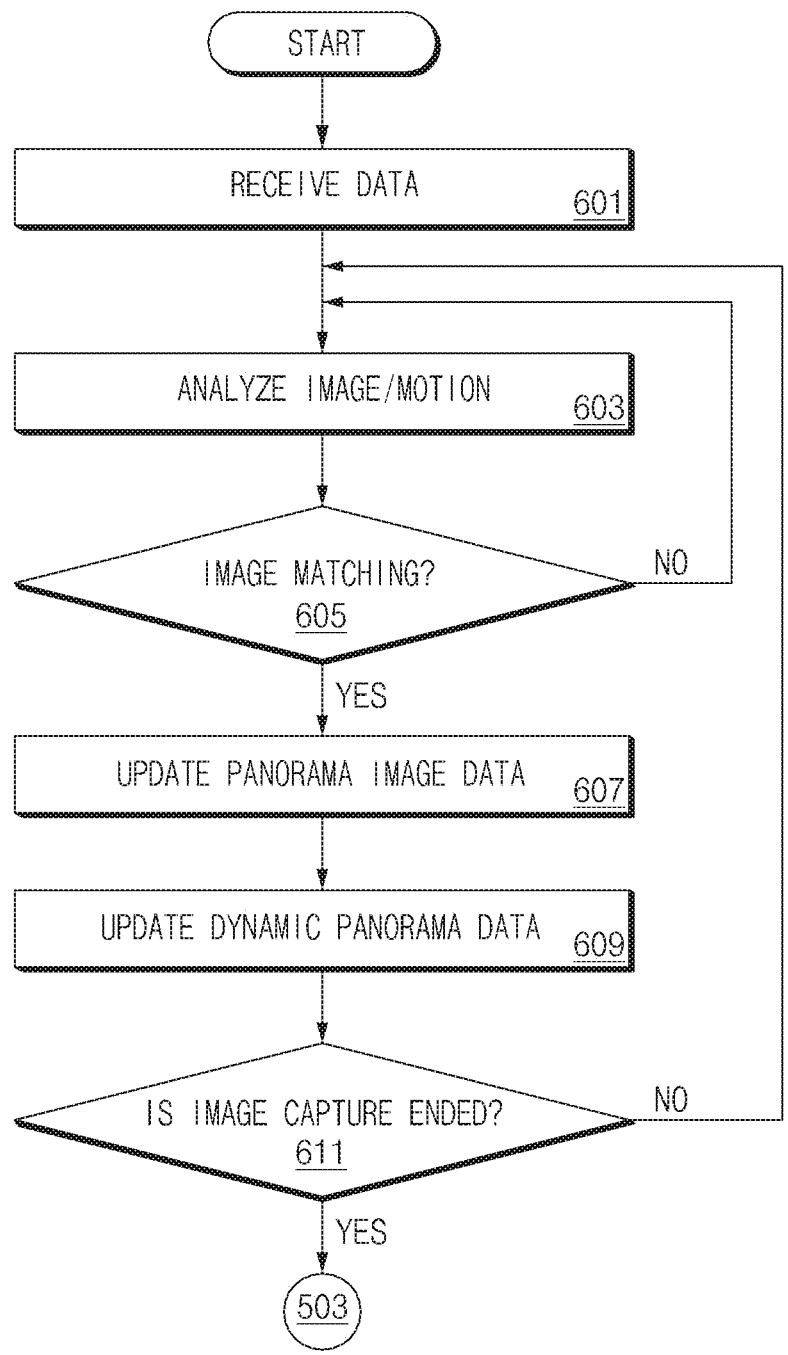
FIG. 6 is a flowchart illustrating a detailed process of generating a panorama content file according to an embodiment of the present disclosure.

FIG. 6 is a flowchart illustrating a detailed process of generating a panorama content file according to an embodiment of the present disclosure.

Referring to FIG. 6, in operation 601, a panorama image generator 121 of FIG. 1 may receive data for generating panorama image data. For example, a plurality of images obtained by a camera 140 of FIG. 1, audio data obtained by a microphone 150 of FIG. 1, motion information of the electronic device 100 obtained by a motion sensor 160 of FIG. 1, time information associated with each of the plurality of images, the audio data and the motion information, and the like may be provided as input data to the panorama image generator 121.

In operation 603, the panorama image generator 121 may analyze the input image and the motion information of the electronic device 100. In operation 605, the panorama image generator 121 may determine whether to match a current input image to panorama image data previously generated by image matching, based on the analyzed result. For example, if it is determined that motion of the electronic device 100 meets a specified condition based on the analyzed result, the panorama image generator 121 may determine that image matching will be performed.

If the image matching is performed, the panorama image generator 121 may update the panorama image data at operation 607. For example, referring to FIG. 3, while matching a $3^{rd}$ image 203 to old panorama image data generated after a $1^{st}$ image 201 and a $2^{nd}$ image 202 are matched to each other, the panorama image generator 121 may crop part of an upper end of the $1^{st}$ image 201 and part of an upper end of the $2^{nd}$ image 202 relative to the $3^{rd}$ image 203.

If updating the panorama image data, the panorama image generator 121 may provide the updated information to a dynamic panorama generator 122 of FIG. 1. The dynamic panorama generator 122 may update the old dynamic panorama data at operation 609 based on the newly provided information.

The above-mentioned image matching process may be repeatedly performed until the panorama image capture is ended. For example, in operation 611, if it is determined that the image capture is ended, operations 503, 505, and 507 of FIG. 5 may be performed. In detail, if the image capture is ended, that is, if an image matching process of the last input image is completed, the panorama image generator 121 may finally generate panorama image data. Also, the dynamic panorama generator 122 may generate dynamic panorama data based on the information finally provided from the panorama image generator 121. Also, a last result generator 123 of FIG. 1 may generate a panorama content file based on the panorama image data and the dynamic panorama data. The panorama content file may have a format (e.g., a joint photographic coding experts group (JPEG), a portable network graphics (PNG), and the like) of an image file, but may additionally include data (e.g., MP4 data) corresponding to a moving image file in its additional data region. For example, the last result generator 123 may generate an image file in which information (e.g., a marker) indicating that additional data is present other than image data is recorded in a header, a footer, or a tail portion of the image file. This information may include information indicating whether additional data (i.e., a variety of additional (analysis) information used to generate dynamic panorama data and panorama image data, and the like) is present, information about a start location, and information about a stop location.

In the above-mentioned description, at least some of the panorama image generator 121, the dynamic panorama generator 122, and the last result generator 123 may be implemented with a software module. In this case, it may be understood that an operation performed by the software module may be performed by the processor 110.

Hereinafter, a description will be given of a method of consuming a panorama content file with reference to FIG. 7.

Figure 7:
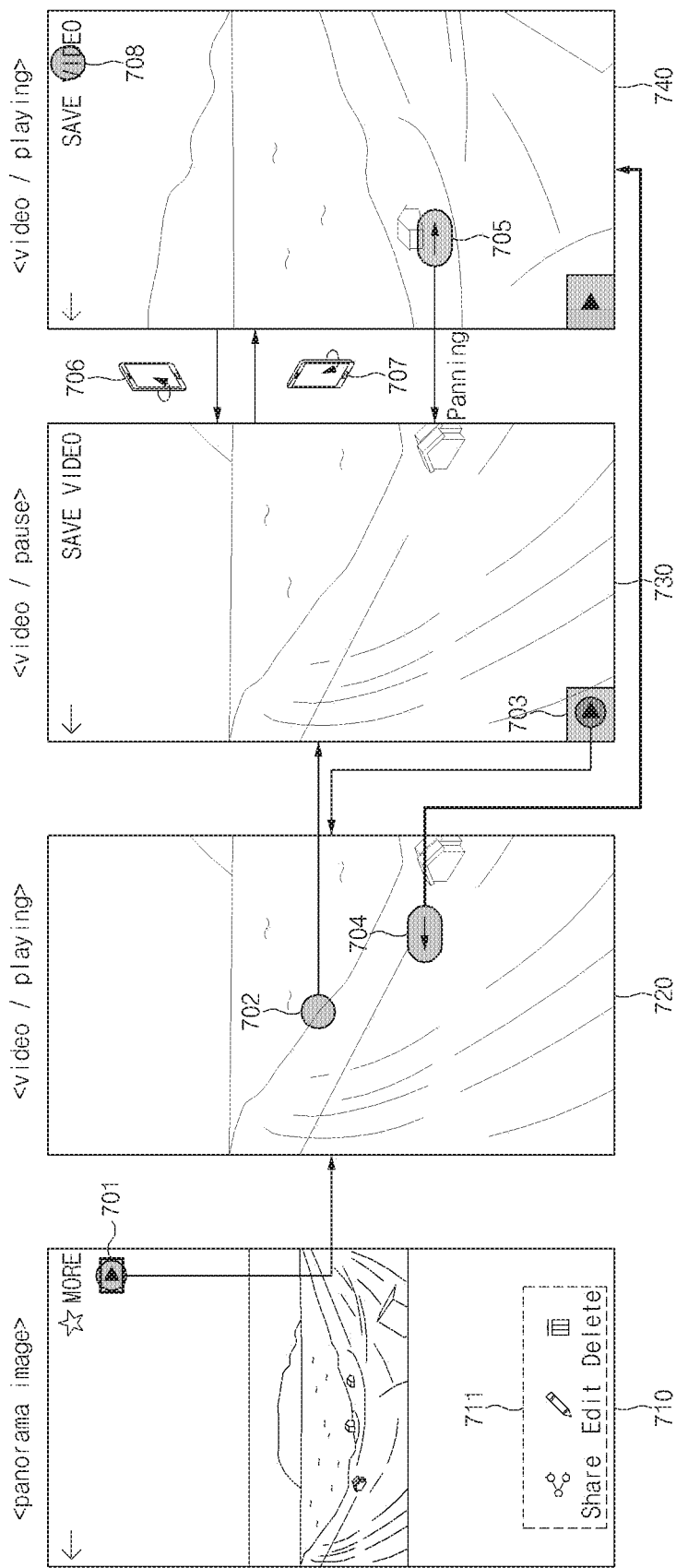
FIG. 7 is a drawing illustrating a screen of executing a panorama content file according to an embodiment of the present disclosure.

FIG. 7 is a drawing illustrating a screen of executing a panorama content file according to an embodiment of the present disclosure.

Referring to FIG. 7, a panorama content file may be displayed on a first screen 710 based on a panorama image. For example, if the panorama content file is executed through an application, a processor 110 of FIG. 1 may display a panorama image based on panorama image data in the panorama content file on a display 170 of FIG. 1. If the panorama image is displayed on the first screen 710, the processor 110 may display control menus 711 (e.g., a share menu, an edit menu, a delete menu, and the like) and an item 701 corresponding to dynamic panorama data in the panorama content file other than the panorama image.

If the item 701 is selected, the processor 110 may reproduce the dynamic panorama data on a second screen 720. For example, the processor 110 may render a panorama video based on the dynamic panorama data and may reproduce the rendered panorama video on the display 170. The processor 110 may render the panorama video in a first time order. Herein, the first time order may correspond to an order of a time when each of images included in the dynamic panorama data is obtained. Also, the processor 110 may render a panorama video in a reverse order of the first time order (i.e., a second time order). For example, if a user performs panorama image capture while moving an electronic device 100 of FIG. 1 in a right direction from the left, the panorama video rendered in the first time order may have an effect shown while a panorama image is moved in a left direction. If a panorama video is rendered in the second time order, the panorama video may have an effect shown while a panorama image is moved in the right direction.

In an embodiment, dynamic panorama data may correspond to encoded video data. Thus, the processor 110 (or a codec corresponding to video data) may decode video data. If the video data is synchronized with a panorama image, for example, if video data is encoded based on images encoded to generate a panorama image, the processor 110 may render decoded frames on the display 170. If video data is encoded based on original images used to generate a panorama image, the processor 110 may edit decoded frames based on metadata (e.g., image analysis information, motion information, and time information) and may render the edited frames on a screen.

Since a panorama video is generated based on a plurality of images used to generate a panorama image, although there is a moved object (e.g., a person, an animal, a car, and the like) during panorama image capture, motion of the object may be reproduced without distortion. Thus, although a moved object is distorted and represented on a panorama image, the user may execute a panorama video to check motion of the object.

A panorama image and a panorama video displayed/reproduced based on a panorama content file may have the same virtual field of view (FOV). As described with reference to FIG. 3, since dynamic panorama data for rendering a panorama video is generated using images and analysis information used to generate panorama image data, when resolution of a panorama image has a first height and a first width, a virtual FOV shown by a panorama video may also have the first height and the first width. In other words, the panorama video may be generated to output the virtual FOV corresponding to the first height and the first width at intervals of an FOV corresponding to the same first height and a second width which is narrower than the first width during a time when reproduced by the processor 110. Herein, since the FOV of the panorama image has a higher value than that of a camera 140 of the electronic device 100, the FOV of the panorama image may be a virtual FOV. However, an image (or a frame) displayed on the display 170 when a panorama video is reproduced may the same as the FOV of the camera 140 or may correspond to a real FOV having a lower range than that of the camera 140 due to encoding.

The reproduction of a panorama video may be controlled in various manners. For example, while a panorama video is reproduced on the second screen 720, if a touch input 702 on any region occurs, video playback may pause on a third screen 730. If a touch input on a playback icon 703 occurs on the third screen 730 or if a touch input on any region occurs again, the reproduction of the panorama video may be resumed. If a touch input 708 on a save video icon occurs, the panorama video may be saved to memory.

A panorama video rendered in a time order may be reproduced on the second screen 720. When a panorama video is reproduced as if the camera 140 is moved from left to right, if a drag input 704 of an opposite direction occurs, the processor 110 may render the panorama video in a reverse order, that is, a reverse order of a time. In this case, the panorama video may be reproduced on a fourth screen 740 like an opposite direction, that is, as if the camera 140 is moved from right to left. If a drag input 705 of the first direction occurs, the processor 110 may pause the video as in the third screen 730.

In another embodiment, a rendering order may be changed by tilting the electronic device 100 in a specified direction while a panorama video is reproduced. For example, if a motion sensor 160 of FIG. 1 senses motion 706 where the electronic device 100 rotates clockwise at an angle or more on a central axis of a vertical direction, the processor 110 may render a panorama video in a first order (e.g., a time order). If the motion sensor 160 senses motion 707 where the electronic device 100 rotates counterclockwise, the processor 110 may render the panorama video in a second order opposite to the first order.

In addition, an event of changing an order of rendering a panorama video may be defined in various manners. For example, if a last frame of a panorama video rendered in the first order is reproduced, the processor 110 may reproduce a panorama video rendered in the second order on the display 170. In this case, the user may have experience as if he or she appreciates a panorama image in one direction (e.g., from left to right) and then appreciates the panorama image in an opposite direction.

Figure 8:
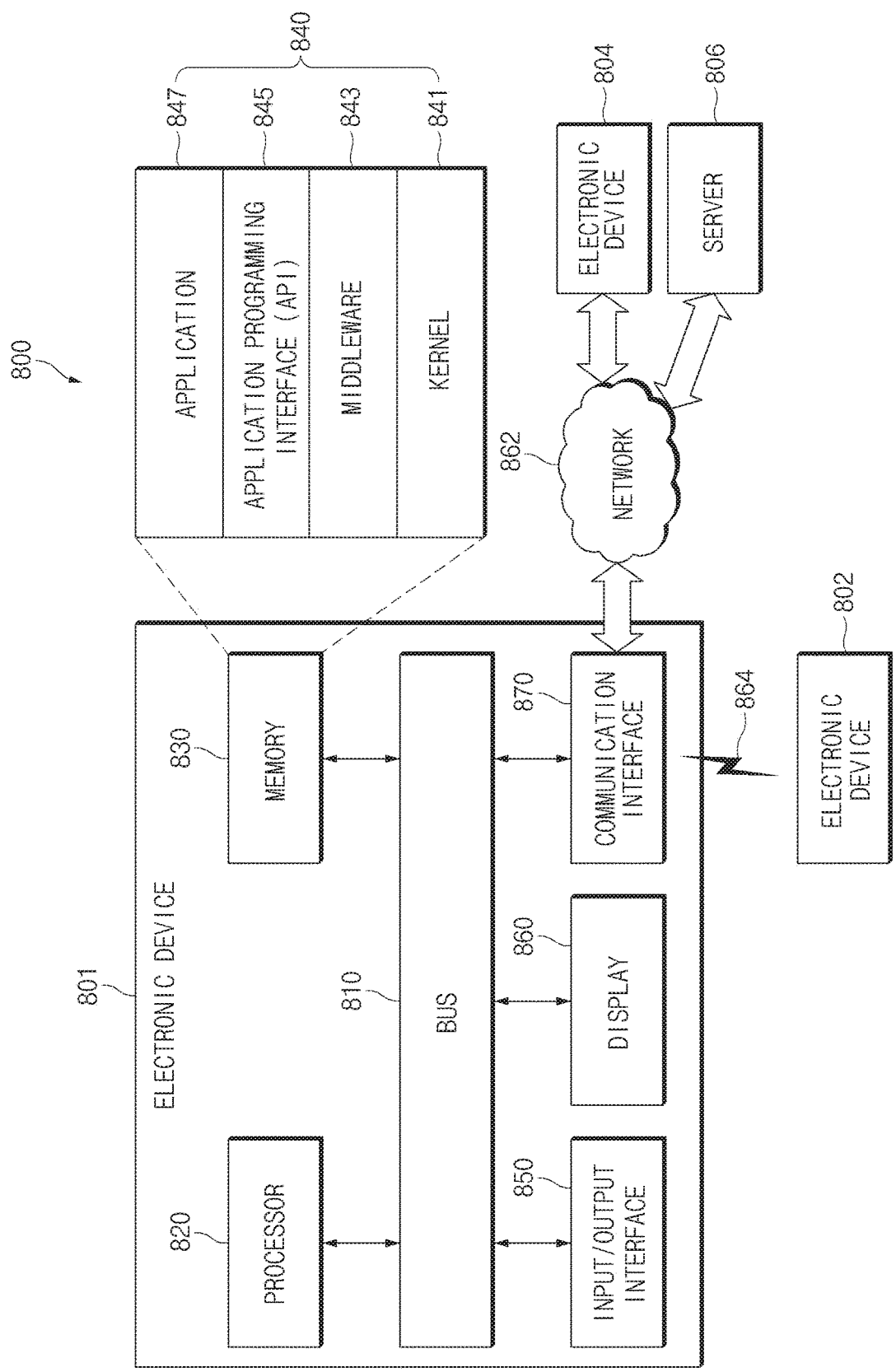
FIG. 8 is a block diagram illustrating an electronic device in a network environment according to an embodiment of the present disclosure.

FIG. 8 illustrates an electronic device in a network environment according to an embodiment of the present disclosure.

Referring to FIG. 8, an electronic device 801 in a network environment 800 according to various embodiments of the present disclosure will be described with reference to FIG. 8. The electronic device 801 may include a bus 810, a processor 820, a memory 830, an input/output interface 850, a display 860, and a communication interface 870. In various embodiments of the present disclosure, at least one of the foregoing elements may be omitted or another element may be added to the electronic device 801.

The bus 810 may include a circuit for connecting the above-mentioned elements 810 to 870 to each other and transferring communications (e.g., control messages and/or data) among the above-mentioned elements.

The processor 820 may include at least one of a CPU, an AP, or a communication processor (CP). The processor 820 may perform data processing or an operation related to communication and/or control of at least one of the other elements of the electronic device 801.

The memory 830 may include a volatile memory and/or a nonvolatile memory. The memory 830 may store instructions or data related to at least one of the other elements of the electronic device 801. According to an embodiment of the present disclosure, the memory 830 may store software and/or a program 840. The program 840 may include, for example, a kernel 841, a middleware 843, an application programming interface (API) 845, and/or an application program (or an application) 847. At least a portion of the kernel 841, the middleware 843, or the API 845 may be referred to as an operating system (OS).

The kernel 841 may control or manage system resources (e.g., the bus 810, the processor 820, the memory 830, or the like) used to perform operations or functions of other programs (e.g., the middleware 843, the API 845, or the application program 847). Furthermore, the kernel 841 may provide an interface for allowing the middleware 843, the API 845, or the application program 847 to access individual elements of the electronic device 801 in order to control or manage the system resources.

The middleware 843 may serve as an intermediary so that the API 845 or the application program 847 communicates and exchanges data with the kernel 841.

Furthermore, the middleware 843 may handle one or more task requests received from the application program 847 according to a priority order. For example, the middleware 843 may assign at least one application program 847 a priority for using the system resources (e.g., the bus 810, the processor 820, the memory 830, or the like) of the electronic device 801. For example, the middleware 843 may handle the one or more task requests according to the priority assigned to the at least one application, thereby performing scheduling or load balancing with respect to the one or more task requests.

The API 845, which is an interface for allowing the application 847 to control a function provided by the kernel 841 or the middleware 843, may include, for example, at least one interface or function (e.g., instructions) for file control, window control, image processing, character control, or the like.

The input/output interface 850 may serve to transfer an instruction or data input from a user or another external device to (an)other element(s) of the electronic device 801. Furthermore, the input/output interface 850 may output instructions or data received from (an)other element(s) of the electronic device 801 to the user or another external device.

The display 860 may include, for example, a liquid crystal display (LCD), a light-emitting diode (LED) display, an organic LED (OLED) display, a microelectromechanical systems (MEMS) display, or an electronic paper display. The display 860 may present various content (e.g., a text, an image, a video, an icon, a symbol, or the like) to the user. The display 860 may include a touch screen, and may receive a touch, gesture, proximity or hovering input from an electronic pen or a part of a body of the user.

The communication interface 870 may set communications between the electronic device 801 and an external device (e.g., a first external electronic device 802, a second external electronic device 804, or a server 806). For example, the communication interface 870 may be connected to a network 862 via wireless communications or wired communications so as to communicate with the external device (e.g., the second external electronic device 804 or the server 806).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (Wi-Bro), or global system for mobile communications (GSM). The wireless communications may include, for example, short-range communications 864. The short-range communications may include at least one of wireless fidelity (Wi-Fi), Bluetooth, near field communication (NFC), magnetic secure transmission (MST), or global navigation satellite system (GNSS).

The MST may generate a pulse by using electro-magnetic signals according to transmission data, and the pulse may cause magnetic signals. The electronic device 801 may transmit the magnetic signals to a point of sales (POS). The POS may detect the magnetic signals using a MST reader and obtain the transmission data by converting the magnetic signals to electronic signals.

The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used. The wired communications may include at least one of universal serial bus (USB), high definition multimedia interface (HDMI), recommended standard 232 (RS-232), plain old telephone service (POTS), or the like. The network 862 may include at least one of telecommunications networks, for example, a computer network (e.g., local area network (LAN) or wide area network (WAN)), the Internet, or a telephone network.

The types of the first external electronic device 802 and the second external electronic device 804 may be the same as or different from the type of the electronic device 801. According to an embodiment of the present disclosure, the server 806 may include a group of one or more servers. A portion or all of operations performed in the electronic device 801 may be performed in one or more other electronic devices (e.g., the first electronic device 802, the second external electronic device 804, or the server 806). When the electronic device 801 should perform a certain function or service automatically or in response to a request, the electronic device 801 may request at least a portion of functions related to the function or service from another device (e.g., the first electronic device 802, the second external electronic device 804, or the server 806) instead of or in addition to performing the function or service for itself. The other electronic device (e.g., the first electronic device 802, the second external electronic device 804, or the server 806) may perform the requested function or additional function, and may transfer a result of the performance to the electronic device 801. The electronic device 801 may use a received result itself or additionally process the received result to provide the requested function or service. To this end, for example, a cloud computing technology, a distributed computing technology, or a client-server computing technology may be used.

Figure 9:
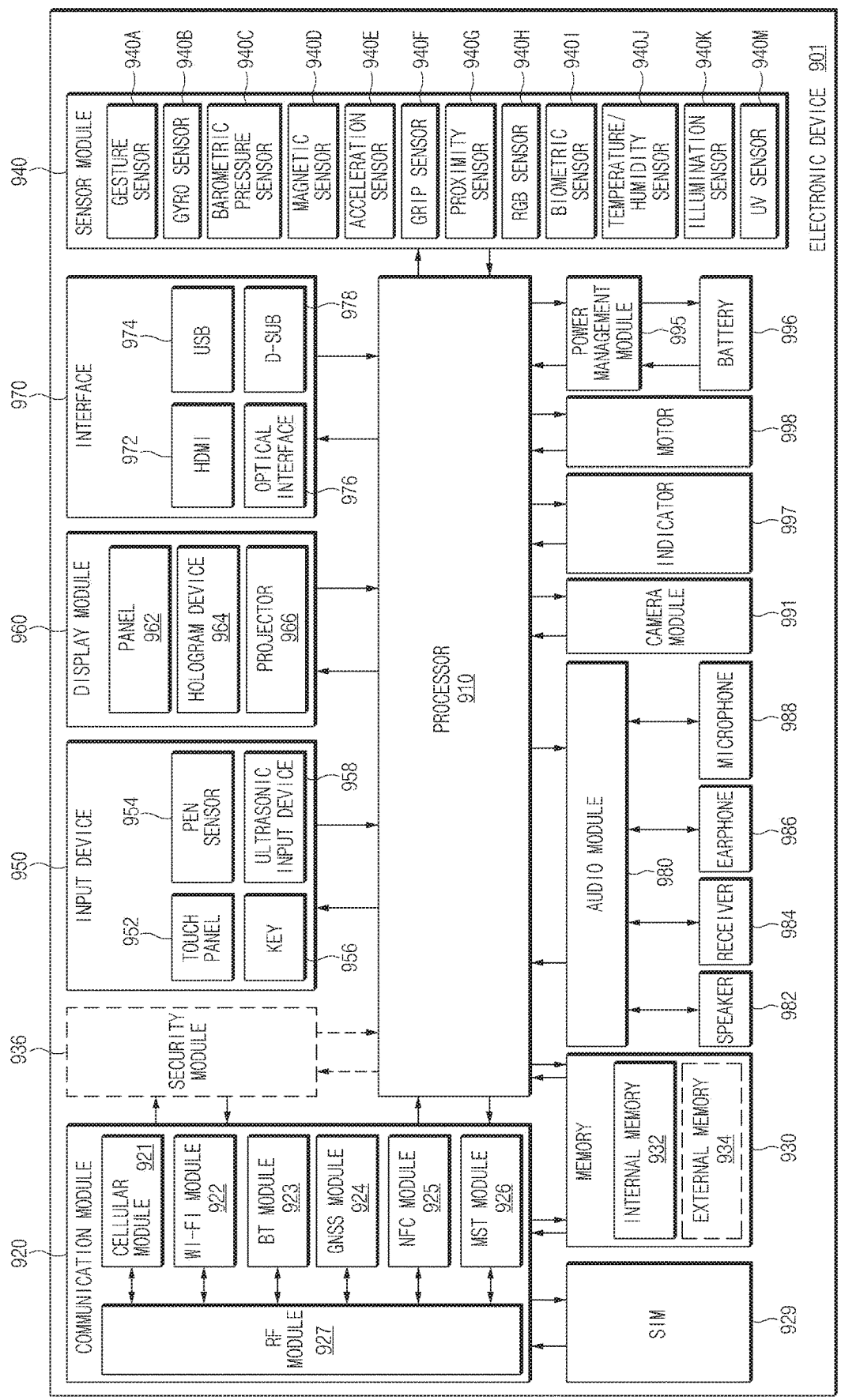
FIG. 9 is a block diagram illustrating a configuration of an electronic device according to an embodiment of the present disclosure.

FIG. 9 is a block diagram illustrating a configuration of an electronic device according to an embodiment of the present disclosure.

Referring to FIG. 9, the electronic device 901 may include, for example, a part or the entirety of the UE 800 illustrated in FIG. 8. The electronic device 901 may include at least one processor (e.g., an AP) 910, a communication module 920, a subscriber identification module (SIM) 929, a memory 930, a sensor module 940, an input device 950, a display module 960, an interface 970, an audio module 980, a camera module 991, a power management module 995, a battery 996, an indicator 997, and a motor 998.

The processor 910 may execute, or run, an OS or an application program so as to control a plurality of hardware or software elements connected to the processor 910, process various data, and perform operations. The processor 910 may be implemented with, for example, a system on chip (SoC). According to an embodiment of the present disclosure, the processor 910 may further include a graphics processing unit (GPU) and/or an image signal processor (ISP). The processor 910 may include at least a portion (e.g., a cellular module 921) of the elements illustrated in FIG. 9. The processor 910 may load, on a volatile memory, an instruction or data received from at least one of the other elements (e.g., a nonvolatile memory) to process the instruction or data, and may store various data in a nonvolatile memory.

The communication module 920 may be configured the same as or similar to that of the communication circuit 820 of FIG. 8. The communication module 920 may include, for example, a cellular module 921 (e.g., a modem), a Wi-Fi module 922, a Bluetooth (BT) module 923, a GNSS module 924 (e.g., a GPS module, a GLONASS module, a BeiDou navigation satellite system module, or a Galileo global navigation satellite system module), a NFC module 925, a MST module 926, and a radio frequency (RF) module 927.

The cellular module 921 may provide, for example, a voice call service, a video call service, a text message service, or an Internet service through a communication network. The cellular module 921 may identify and authenticate the electronic device 901 in the communication network using the SIM 929 (e.g., a SIM card). The cellular module 921 may perform at least a part of the functions that may be provided by the processor 910. The cellular module 921 may include a CP.

Each of the Wi-Fi module 922, the Bluetooth module 923, the GNSS module 924, the NFC module 925, and the MST module 926 may include, for example, a processor for processing data transmitted/received through the modules. According to an embodiment of the present disclosure, at least a part (e.g., two or more) of the cellular module 921, the Wi-Fi module 922, the Bluetooth module 923, the GNSS module 924, the NFC module 925, and the MST module 926 may be included in a single integrated circuit (IC) or IC package.

The RF module 927 may transmit/receive, for example, communication signals (e.g., RF signals). The RF module 927 may include, for example, a transceiver, a power amplifier module (PAM), a frequency filter, a low noise amplifier (LNA), an antenna, or the like. According to an embodiment of the present disclosure, at least one of the cellular module 921, the Wi-Fi module 922, the Bluetooth module 923, the GNSS module 924, the NFC module 925, or the MST module 926 may transmit/receive RF signals through a separate RF module.

The SIM 929 may include, for example, an embedded SIM and/or a card containing the SIM, and may include unique identification information (e.g., an integrated circuit card identifier (ICCID)) or subscriber information (e.g., an international mobile subscriber identity (IMSI)).

The memory 930 (e.g., the memory 860 of FIG. 8) may include, for example, an internal memory 932 or an external memory 934. The internal memory 932 may include at least one of a volatile memory (e.g., a dynamic random access memory (DRAM), a static random access memory (SRAM), a synchronous DRAM (SDRAM), or the like), a nonvolatile memory (e.g., a one-time programmable read only memory (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 934 may include a flash drive such as a compact flash (CF) drive, a secure digital (SD) drive, a micro-SD drive, a mini-SD drive, an extreme digital (xD) drive, a multi media card (MMC), a memory stick, or the like. The external memory 934 may be operatively and/or physically connected to the electronic device 901 through various interfaces.

A security module 936, which is a module including a storage space that is more secure (e.g. has a higher security level) than the memory 930, may be a circuit for providing secure data storage and protected execution circumstances. The security module 936 may be implemented with an additional circuit and may include an additional processor. The security module 936 may be present in an attachable smart chip or SD card, or may include an embedded secure element (eSE), which is installed in a fixed chip. Additionally, the security module 936 may be driven in another OS which is different from the OS of the electronic device 901. For example, the security module 936 may operate based on a java card open platform (JCOP) OS.

The sensor module 940 may, for example, measure a physical quantity or detect an operation state of the electronic device 901 so as to convert measured or detected information into an electrical signal. The sensor module 940 may include, for example, at least one of a gesture sensor 940A, a gyro sensor 940B, a barometric pressure sensor 940C, a magnetic sensor 940D, an acceleration sensor 940E, a grip sensor 940F, a proximity sensor 940G, a color sensor 940H (e.g., a red/green/blue (RGB) sensor), a biometric sensor 940I, a temperature/humidity sensor 940J, an illumination sensor 940K, or an ultraviolet (UV) light sensor 940M. Additionally, or alternatively, the sensor module 940 may include, for example, an olfactory sensor (e.g., an electronic nose (E-nose) sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 940 may further include a control circuit for controlling at least one sensor included therein. In an embodiment of the present disclosure, the electronic device 901 may further include a processor configured to control the sensor module 940 as a part of the processor 910 or separately, so that the sensor module 940 is controlled while the processor 910 is in a reduced power, or sleep, state.

The input device 950 may include, for example, a touch panel 952, a (digital) pen sensor 954, a key 956, or an ultrasonic input device 958. The touch panel 952 may employ at least one of a capacitive, a resistive method, an infrared method, and an ultraviolet light sensing method. The touch panel 952 may further include a control circuit. The touch panel 952 may further include a tactile layer so as to provide a haptic feedback to a user.

The (digital) pen sensor 954 may include, for example, a sheet for recognition which is a part of a touch panel or is separate. The key 956 may include, for example, a physical button, an optical button, or a keypad. The ultrasonic input device 958 may sense ultrasonic waves generated by an input tool through a microphone 988 so as to identify data corresponding to the ultrasonic waves sensed.

The display module 960 (e.g., the display 870 of FIG. 8) may include a panel 962, a hologram device 964, or a projector 966. The panel 962 may be configured the same as or similar to that of the display 870 of FIG. 8. The panel 962 may be, for example, flexible, transparent, or wearable. The panel 962 and the touch panel 952 may be integrated into a single module. The hologram device 964 may display a stereoscopic image in a space using a light interference phenomenon. The projector 966 may project light onto a screen so as to display an image. The screen may be disposed internally or externally to the electronic device 901. According to an embodiment of the present disclosure, the display module 960 may further include a control circuit for controlling the panel 962, the hologram device 964, or the projector 966.

The interface 970 may include, for example, an HDMI 972, a USB 974, an optical interface 976, or a D-subminiature (D-sub) connector 978. The interface 970, for example, may be included in the communication circuit 820 of FIG. 8. Additionally, or alternatively, the interface 970 may include, for example, a mobile high-definition link (MHL) interface, an SD/MMC interface, or an Infrared Data Association (IrDA) interface.

The audio module 980 may convert, for example, a sound into an electrical signal or vice versa. The audio module 980 may process sound information input or output through a speaker 982, a receiver 984, an earphone 986, or the microphone 988.

The camera module 991 is, for example, a device for taking a still image or a video. According to an embodiment of the present disclosure, the camera module 991 may include at least one image sensor (e.g., a front sensor or a rear sensor), a lens, an ISP, or a flash (e.g., a LED or a xenon lamp).

The power management module 995 may manage power of the electronic device 901. According to an embodiment of the present disclosure, the power management module 995 may include a power management integrated circuit (PMIC), a charger IC, a battery, or a battery gauge. The PMIC may employ a wired and/or a wireless charging method. A wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 996 and a voltage, current, or temperature thereof while the battery is charged. The battery 996 may include, for example, a rechargeable battery and/or a solar battery.

The indicator 997 may display a certain state of the electronic device 901 or a part thereof (e.g., the processor 910), such as a booting state, a message state, a charging state, or the like. The motor 998 may convert an electrical signal into a mechanical vibration, and may generate a vibration or a haptic effect. A processing device (e.g., a GPU) for supporting mobile television (TV) may be included in the electronic device 901. The processing device for supporting mobile TV may process media data according to the standards of digital multimedia broadcasting (DMB), digital video broadcasting (DVB), MediaFLO™, or the like.

Each of the elements described herein may be configured with one or more components, and the names of the elements may be changed according to the type of an electronic device. In various embodiments of the present disclosure, an electronic device may include at least one of the elements described herein, and some elements may be omitted or other additional elements may be added. Furthermore, some of the elements of the electronic device may be combined with each other so as to form one entity, so that the functions of the elements may be performed in the same manner as before the combination.

Figure 10:
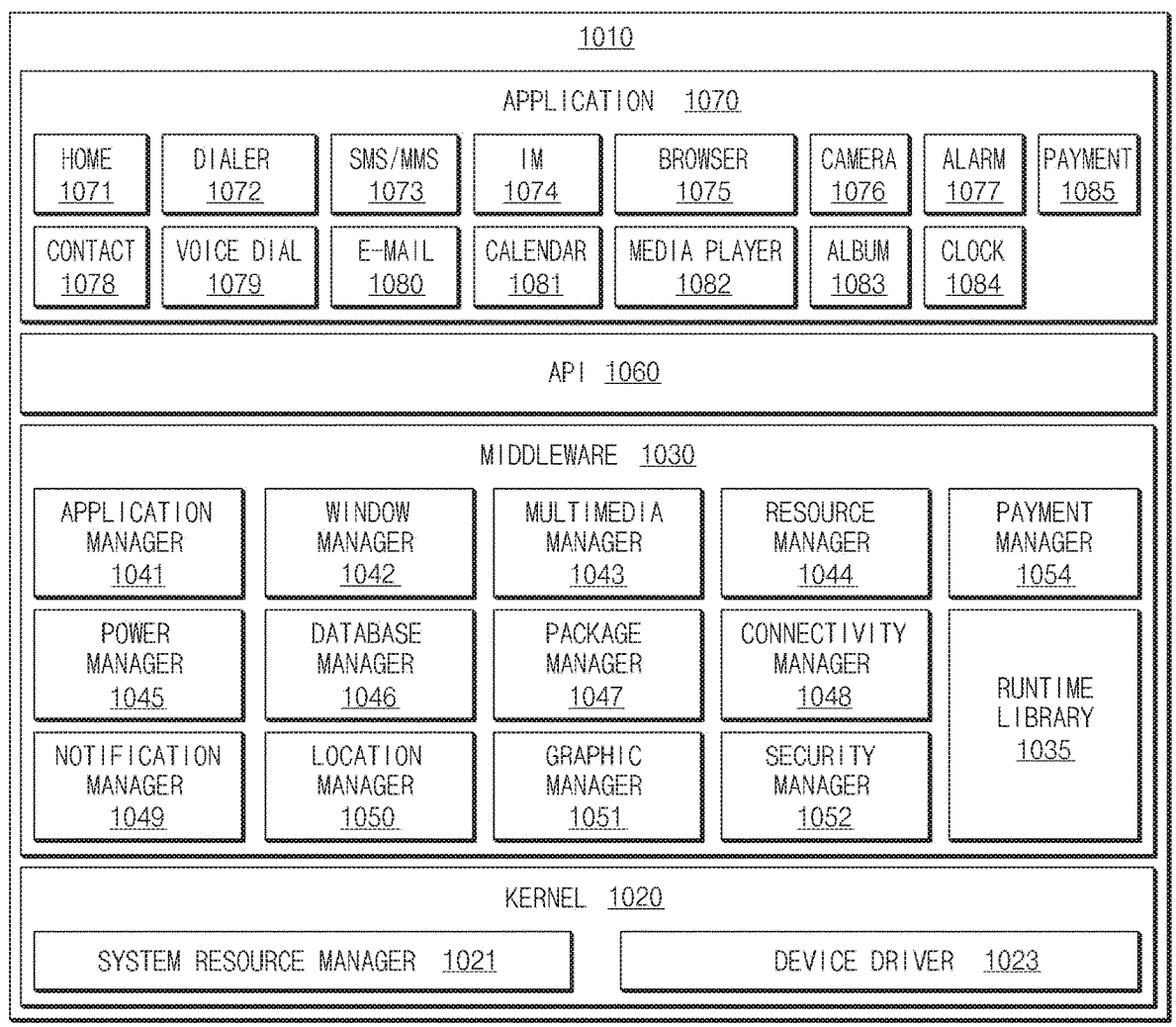
FIG. 10 is a block diagram illustrating a configuration of a program module according to an embodiment of the present disclosure.

FIG. 10 is a block diagram illustrating a program module according to an embodiment of the present disclosure.

Referring to FIG. 10, a program module 1010 (e.g., the program 840) may include an OS for controlling a resource related to an electronic device (e.g., the electronic device 801) and/or various applications (e.g., the application program 847) running on the OS. The OS may be, for example, Android, iOS, Windows, Symbian, Tizen, or the like.

The program module 1010 may include a kernel 1020, a middleware 1030, an API 1060, and/or an application 1070. At least a part of the program module 1010 may be preloaded on an electronic device or may be downloaded from an external electronic device (e.g., the first electronic device 802, the second external electronic device 804, or the server 806).

The kernel 1020 (e.g., the kernel 841) may include, for example, a system resource manager 1021 or a device driver 1023. The system resource manager 1021 may perform control, allocation, or retrieval of a system resource. According to an embodiment of the present disclosure, the system resource manager 1021 may include a process management unit, a memory management unit, a file system management unit, or the like. The device driver 1023 may include, for example, a display driver, a camera driver, a Bluetooth driver, a shared memory driver, a USB driver, a keypad driver, a Wi-Fi driver, an audio driver, or an inter-process communication (IPC) driver.

The middleware 1030, for example, may provide a function that the applications 1070 require in common, or may provide various functions to the applications 1070 through the API 1060 so that the applications 1070 may efficiently use limited system resources in the electronic device. According to an embodiment of the present disclosure, the middleware 1030 (e.g., the middleware 843) may include at least one of a runtime library 1035, an application manager 1041, a window manager 1042, a multimedia manager 1043, a resource manager 1044, a power manager 1045, a database manager 1046, a package manager 1047, a connectivity manager 1048, a notification manager 1049, a location manager 1050, a graphic manager 1051, a security manager 1052, and a payment manager 1054.

The runtime library 1035 may include, for example, a library module that a complier uses to add a new function through a programming language while the application 1070 is running. The runtime library 1035 may perform a function for input/output management, memory management, or an arithmetic function.

The application manager 1041 may mange, for example, a life cycle of at least one of the applications 1070. The window manager 1042 may manage a GUI resource used in a screen. The multimedia manager 1043 may recognize a format required for playing various media files and may encode or decode a media file using a codec matched to the format. The resource manager 1044 may manage a resource such as a source code, a memory, or a storage space of at least one of the applications 1070.

The power manager 1045, for example, may operate together with a basic input/output system (BIOS) to manage a battery or power and may provide power information required for operating the electronic device. The database manager 1046 may generate, search, or modify a database to be used in at least one of the applications 1070. The package manager 1047 may manage installation or update of an application distributed in a package file format.

The connectivity manger 1048 may manage wireless connection of Wi-Fi, Bluetooth, or the like. The notification manager 1049 may display or notify an event such as message arrival, appointments, and proximity alerts in such a manner as not to disturb a user. The location manager 1050 may manage location information of the electronic device. The graphic manager 1051 may manage a graphic effect to be provided to a user or a user interface related thereto. The security manager 1052 may provide various security functions required for system security or user authentication. According to an embodiment of the present disclosure, in the case in which an electronic device (e.g., the electronic device 801) includes a phone function, the middleware 1030 may further include a telephony manager for managing a voice or video call function of the electronic device.

The middleware 1030 may include a middleware module for forming a combination of various functions of the above-mentioned elements. The middleware 1030 may provide a module specialized for each type of an OS to provide differentiated functions. Furthermore, the middleware 1030 may delete a part of existing elements or may add new elements dynamically.

The API 1060 (e.g., the API 845) which is, for example, a set of API programming functions may be provided in different configurations according to an OS. For example, in the case of Android or iOS, one API set may be provided for each platform, and, in the case of Tizen, at least two API sets may be provided for each platform.

The application 1070 (e.g., the application program 847), for example, may include at least one application capable of performing functions such as a home 1071, a dialer 1072, an short message service (SMS)/multimedia messaging service (MMS) 1073, an instant message (IM) 1074, a browser 1075, a camera 1076, an alarm 1077, a contact 1078, a voice dial 1079, an e-mail 1080, a calendar 1081, a media player 1082, an album 1083, a clock 1084, a payment application 1085, health care (e.g., measure an exercise amount or blood sugar), or environmental information provision (e.g., provide air pressure, humidity, or temperature information).

According to an embodiment of the present disclosure, the application 1070 may include an information exchange application for supporting information exchange between the electronic device (e.g., the electronic device 801) and an external electronic device (e.g., the first electronic device 802 or the second external electronic device 804). The information exchange application may include, for example, a notification relay application for relaying specific information to the external electronic device or a device management application for managing the external electronic device.

For example, the notification relay application may have a function for relaying, to an external electronic device (e.g., the first electronic device 802 or the second external electronic device 804), notification information generated in another application (e.g., an SMS/MMS application, an e-mail application, a health care application, an environmental information application, or the like) of the electronic device. Furthermore, the notification relay application may receive notification information from the external electronic device and may provide the received notification information to the user.

The device management application, for example, may manage (e.g., install, delete, or update) at least one function (e.g., turn-on/turn off of the external electronic device itself (or some elements) or the brightness (or resolution) adjustment of a display) of the external electronic device (e.g., the first electronic device 802 or the second external electronic device 804) communicating with the electronic device, an application running in the external electronic device, or a service (e.g., a call service, a message service, or the like) provided from the external electronic device.

According to an embodiment of the present disclosure, the application 1070 may include a specified application (e.g., a healthcare application of a mobile medical device) according to an attribute of the external electronic device (e.g., the first electronic device 802 or the second external electronic device 804). The application 1070 may include an application received from an external electronic device (e.g., the first electronic device 802 or the second external electronic device 804). The application 1070 may include a preloaded application or a third-party application downloadable from a server. The names of the elements of the program module 1010 illustrated may vary with the type of an operating system.

According to various embodiments of the present disclosure, at least a part of the program module 1010 may be implemented with software, firmware, hardware, or a combination thereof. At least a part of the program module 1010, for example, may be implemented (e.g., executed) by a processor (e.g., the processor 910). At least a part of the program module 1010 may include, for example, a module, a program, a routine, sets of instructions, or a process for performing at least one function.

According to various embodiments described in the present disclosure, the electronic device may reproduce motion of an object included in panorama image capture by providing a dynamic panorama which may be reproduced as video other than a panorama image (still image) upon panorama image capture.

Further, according to an embodiment, the electronic device may synchronize a panorama image (a static panorama) with a panorama video (a dynamic panorama) by using images and analysis information used to generate a panorama image to generate a dynamic panorama.

Further, according to an embodiment, the electronic device may provide a dynamic panorama synchronized with audio data obtained upon panorama image capture.

In addition, the electronic device may provide a variety of effects directly or indirectly ascertained through the present disclosure.

The term "module" used herein may represent, for example, a unit including one of hardware, software and firmware or a combination thereof. The term "module" may be interchangeably used with the terms "unit", "logic", "logical block", "component" and "circuit". The "module" may be a minimum unit of an integrated component or may be a part thereof. The "module" may be a minimum unit for performing one or more functions or a part thereof. The "module" may be implemented mechanically or electronically. For example, the "module" may include at least one of an application-specific integrated circuit (ASIC) chip, a field-programmable gate array (FPGA), and a programmable-logic device for performing some operations, which are known or will be developed.

At least a part of devices (e.g., modules or functions thereof) or methods (e.g., operations) according to various embodiments of the present disclosure may be implemented as instructions stored in a non-transitory computer-readable storage medium in the form of a program module. In the case where the instructions are performed by a processor (e.g., the processor 820), the processor may perform functions corresponding to the instructions. The non-transitory computer-readable storage medium may be, for example, the memory 830.

The non-transitory computer-readable recording medium may include a hard disk, a floppy disk, a magnetic medium (e.g., a magnetic tape), an optical medium (e.g., compact disc-ROM (CD-ROM), digital versatile disc (DVD)), a magneto-optical medium (e.g., a floptical disk), or a hardware device (e.g., a ROM, a RAM, a flash memory, or the like). The program instructions may include machine language codes generated by compilers and high-level language codes that can be executed by computers using interpreters.

The above-mentioned hardware device may be configured to be operated as one or more software modules for performing operations of various embodiments of the present disclosure and vice versa.

For example, an electronic device may include a processor and a memory for storing computer-readable instructions. The memory may include instructions for performing the above-mentioned various methods or functions when executed by the processor.

A module or a program module according to various embodiments of the present disclosure may include at least one of the above-mentioned elements, or some elements may be omitted or other additional elements may be added. Operations performed by the module, the program module or other elements according to various embodiments of the present disclosure may be performed in a sequential, parallel, iterative or heuristic way. Furthermore, some operations may be performed in another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   at least one processor;
   a memory;
   a display;
   a camera configured to sequentially obtain a plurality of images if-based on an image capture starting; and
   a sensor configured to sense motion of the electronic device,
   wherein the at least one processor is configured to:
      store in the memory a panorama content file comprising panorama image data and dynamic panorama data generated based on the plurality of images and the motion of the electronic device sensed during the image capture,
      reproduce a panorama video rendered in a first order on the display, based on the dynamic panorama data, and
      reproduce the panorama video rendered in a second order opposite to the first order on the display, based on an event occurring during reproduction of the panorama video rendered in the first order.

2. The electronic device of claim 1, wherein the dynamic panorama data is generated based on images and analysis information used to generate the panorama image data.

3. The electronic device of claim 1, further comprising:
   a dynamic panorama generator configured to be implemented with hardware,
   wherein the memory is configured to store a first instruction set for implementing a panorama image generator and a second instruction set for implementing a last file generator.

4. The electronic device of claim 3,
   wherein the panorama image generator is configured to:
      generate the panorama image data during the image capture in progress, and
      provide analysis information, used to generate the panorama image data, to the dynamic panorama generator, and
   wherein the dynamic panorama generator is further configured to generate the dynamic panorama data during the image capture.

5. The electronic device of claim 4, wherein the last file generator is configured to generate the panorama content file based on the panorama image data obtained from the panorama image generator and the dynamic panorama data obtained from the dynamic panorama generator, based on the image capture stopping.

6. The electronic device of claim 1,
wherein the panorama image data is generated to have a resolution of a first height and a first width, and
wherein the dynamic panorama data is generated to output a virtual field of view (FOV) corresponding to the first height and the first width during a time, when reproduced by the at least one processor.

7. The electronic device of claim 6, wherein the dynamic panorama data is configured to be rendered at a variable frame rate, when reproduced by the at least one processor.

8. The electronic device of claim 6, wherein the dynamic panorama data is configured to be rendered at a constant frame rate, when reproduced by the at least one processor.

9. The electronic device of claim 2, further comprising:
a microphone configured to obtain audio data during the image capture,
wherein the dynamic panorama data is generated based on the plurality of images, the analysis information, and the audio data.

10. The electronic device of claim 9, wherein the dynamic panorama data is generated to synchronize a time when each of the plurality of images is obtained with a time when the audio data is obtained.

11. The electronic device of claim 1,
wherein the memory is further configured to store an application associated with the panorama content file, and
wherein the at least one processor is further configured to display an item corresponding to the dynamic panorama data, based on the panorama image data being displayed by the application.

12. The electronic device of claim 11, wherein the at least one processor is further configured to reproduce the dynamic panorama data, based on selection of the item.

13. The electronic device of claim 1, wherein the dynamic panorama data comprises video data in which images used to generate the panorama image data are encoded.

14. An electronic device comprising:
a memory;
a camera configured to sequentially obtain a plurality of images when an image capture is started;
a display;
a sensor configured to sense motion of the electronic device; and
at least one processor configured to:
generate panorama image data based on the plurality of images and the motion of the electronic device sensed during the image capture,
store a panorama content file, comprising the panorama image data and dynamic panorama data corresponding to the panorama image data, and metadata, comprising information about the plurality of images and analysis information used to generate the panorama image data, in the memory,
reproduce a panorama video rendered in a first order on the display, based on the dynamic panorama data and the metadata, and
reproduce a panorama video rendered in a second order opposite to the first order on the display, based on an event occurring during reproduction of the panorama video rendered in the first order.

15. The electronic device of claim 14, wherein the at least one processor is further configured to display an item corresponding to the dynamic panorama data when a panorama image is displayed on the display.

16. The electronic device of claim 15, wherein the at least one processor is further configured to reproduce the panorama video rendered in the first order on the display, based on selection of the item.

17. The electronic device of claim 14, wherein the event comprises at least one of an occurrence of a previously defined user input or a sensing of a previously defined motion by the sensor.

18. The electronic device of claim 14, wherein the event comprises a reproduction of a last frame of the panorama video rendered in the first order.

19. A method of operating a panorama function of an electronic device, the method comprising:
obtaining a plurality of images via a camera of the electronic device;
sensing motion of the electronic device, while obtaining the plurality of images;
generating panorama image data based on the plurality of images and the motion;
generating dynamic panorama data based on the plurality of images and analysis information used to generate the panorama image data;
generating a panorama content file comprising the panorama image data and the dynamic panorama data;
reproducing a panorama video rendered in a first order on a display, based on the dynamic panorama data, based on selection of an item corresponding to the dynamic panorama data; and
reproducing a panorama video rendered in a second order opposite to the first order on the display, based on an event occurring during reproduction of the panorama video rendered in the first order.

* * * * *

UNITED STATES PATENT AND TRADEMARK OFFICE
CERTIFICATE OF CORRECTION

PATENT NO. : 10,659,684 B2
APPLICATION NO. : 15/431210
DATED : May 19, 2020
INVENTOR(S) : Si Hyoung Lee et al.

It is certified that error appears in the above-identified patent and that said Letters Patent is hereby corrected as shown below:

In the Claims

1. Claim 1, at Column 24, Line 32, please replace "images if-based on an image capture starting; and" with --images based on an image capture starting; and--

Signed and Sealed this
Sixth Day of April, 2021

Drew Hirshfeld
*Performing the Functions and Duties of the
Under Secretary of Commerce for Intellectual Property and
Director of the United States Patent and Trademark Office*